US008344083B2

(12) United States Patent
Um et al.

(10) Patent No.: US 8,344,083 B2
(45) Date of Patent: Jan. 1, 2013

(54) RESIN COMPOSITION AND OPTICAL FILMS FORMED BY USING THE SAME

(75) Inventors: Jun-Geun Um, Daejeon (KR); Min-Hee Lee, Daejeon (KR); Nam-Jeong Lee, Daejeon (KR); Jong-Hun Lee, Daejeon (KR); Dong-Ryul Kim, Daejeon (KR); Sae-Han Cho, Daejeon (KR)

(73) Assignee: LG Chem, Ltd. (KR)

( * ) Notice: Subject to any disclaimer, the term of this patent is extended or adjusted under 35 U.S.C. 154(b) by 225 days.

(21) Appl. No.: 12/387,549

(22) Filed: May 4, 2009

(65) Prior Publication Data

US 2009/0275718 A1   Nov. 5, 2009

Related U.S. Application Data

(63) Continuation of application No. PCT/KR2009/002302, filed on Apr. 30, 2009.

(30) Foreign Application Priority Data

Apr. 30, 2008  (KR) ........................ 10-2008-0040843
Jan. 9, 2009   (KR) ........................ 10-2009-0002069

(51) Int. Cl.
      C08F 22/40       (2006.01)
(52) U.S. Cl. ........ 526/280; 526/281; 526/318; 526/346; 526/347; 526/347.1; 526/937
(58) Field of Classification Search ............... 526/280, 526/281, 318, 346, 347, 347.1, 937
See application file for complete search history.

(56) References Cited

U.S. PATENT DOCUMENTS

| | | | |
|---|---|---|---|
| 4,419,399 A | 12/1983 | Ichikawa et al. | |
| 4,607,079 A | 8/1986 | Giles, Jr. et al. | |
| 4,727,117 A | 2/1988 | Hallden-Abberton et al. | |
| 4,877,833 A | 10/1989 | Kondo et al. | |
| 5,004,777 A | 4/1991 | Hallden-Abberton et al. | |
| 5,049,313 A | 9/1991 | Frentzel | |
| 5,200,492 A | 4/1993 | Ohnaga et al. | |
| 5,244,862 A | 9/1993 | Bailey | |
| 5,344,868 A | 9/1994 | Hallden-Abberton et al. | |
| 5,710,216 A * | 1/1998 | Weber et al. | 525/132 |
| 5,891,357 A | 4/1999 | Akashi et al. | |
| 5,905,554 A * | 5/1999 | Kyu | 349/122 |
| 5,994,022 A | 11/1999 | Tanabe et al. | |
| 6,080,833 A | 6/2000 | Otsuji et al. | |
| 6,197,898 B1 | 3/2001 | van den Berg et al. | |
| 7,875,328 B2 | 1/2011 | Um et al. | |
| 2002/0018163 A1 | 2/2002 | Yamamoto et al. | |
| 2002/0039651 A1 | 4/2002 | Murata | |
| 2003/0043730 A1 | 3/2003 | Uchiyama et al. | |
| 2003/0137620 A1 | 7/2003 | Wang et al. | |
| 2004/0063887 A1 | 4/2004 | Toyomasu et al. | |
| 2005/0046967 A1 | 3/2005 | Kosaka et al. | |
| 2005/0068492 A1 | 3/2005 | Itoh et al. | |
| 2005/0117099 A1 | 6/2005 | Yamaoka et al. | |
| 2005/0129895 A1 | 6/2005 | Nakamura | |
| 2006/0013967 A1 | 1/2006 | Mikoshiba et al. | |
| 2006/0055853 A1 | 3/2006 | Murakami et al. | |
| 2006/0063105 A1 | 3/2006 | Oberlander et al. | |
| 2006/0063858 A1 | 3/2006 | Kang et al. | |
| 2006/0066787 A1 | 3/2006 | Yoda et al. | |
| 2006/0066946 A1 | 3/2006 | Liu et al. | |
| 2006/0093845 A1 | 5/2006 | Chien et al. | |
| 2006/0177607 A1 | 8/2006 | Ohmori et al. | |
| 2006/0252234 A1 | 11/2006 | Saiki | |
| 2007/0141355 A1 | 6/2007 | Kosaka et al. | |
| 2007/0172181 A1 | 7/2007 | Imai et al. | |
| 2007/0282077 A1 * | 12/2007 | Miyamoto et al. | 525/418 |
| 2009/0197020 A1 * | 8/2009 | Kim et al. | 428/1.31 |
| 2009/0275718 A1 | 11/2009 | Um et al. | |

FOREIGN PATENT DOCUMENTS

| | | |
|---|---|---|
| CN | 101087846 A | 12/2007 |
| EP | 0267574 A | 11/1987 |
| EP | 0483917 A | 10/1990 |
| EP | 0483717 A2 | 5/1992 |
| EP | 0717078 A1 | 6/1996 |
| EP | 1865346 A1 | 12/2007 |
| EP | 1933181 A1 | 6/2008 |
| JP | 62-89705 A | 4/1987 |
| JP | 4146984 A | 5/1992 |
| JP | 4-266957 A | 9/1992 |
| JP | 6155932 A | 6/1994 |
| JP | 7157632 A | 6/1995 |
| JP | 08248202 A | 9/1996 |
| JP | 10-030048 A | 2/1998 |
| JP | 2000256635 A | 9/2000 |
| JP | 2001-220515 A | 8/2001 |

(Continued)

OTHER PUBLICATIONS

JPO Website Machine English Translation of JP 2004-204208, Suzuki, Jul. 22, 2004.
International Search Report, PCT/KR2009/002303, dated Dec. 12, 2009.
International Search Report, PCT/KR2009/002302, dated Nov. 10, 2009.
U.S. Appl. No. 12/319,472.
U.S. Appl. No. 12/319,471.
U.S. Appl. No. 12/319,469.
Hcengpei Wu et al: "Miscibility of Phenoxy Polymer/Polyacrylate Blends", Macromolecular Chemistry and Physics, Wiley-VCH Verlag, Weinheim, DE, vol. 197 No. 10, Oct. 1, 1996, pp. 3191-3197, XP 000634279.
Supplementary European Search Report EP 09700848, dated Mar. 18, 2011.

(Continued)

Primary Examiner — Robert D. Harlan
(74) Attorney, Agent, or Firm — Lerner, David, Littenberg, Krumholz & Mentlik, LLP

(57) ABSTRACT

The present invention relates to a transparent resin composition which comprises (a) a (meth)acrylate based unit comprising one or more (meth)acrylate based derivatives; (b) an aromatic based unit having a chain having the hydroxy group containing portion and an aromatic moiety and (c) a styrene-based unit comprising one or more styrene-based derivatives, and an optical film that is formed by using the same.

20 Claims, No Drawings

FOREIGN PATENT DOCUMENTS

| | | |
|---|---|---|
| JP | 2002243943 A | 8/2002 |
| JP | 2002301788 A | 10/2002 |
| JP | 2003315557 A | 11/2003 |
| JP | 2004-204208 | 7/2004 |
| JP | 2005070534 A | 3/2005 |
| JP | 2005266464 A | 9/2005 |
| JP | 2006220726 A | 8/2006 |
| JP | 2007-031537 A | 2/2007 |
| JP | 2007046044 A | 2/2007 |
| JP | 2007112956 A | 5/2007 |
| JP | 2007169583 A | 7/2007 |
| JP | 2007169586 A | 7/2007 |
| JP | 2007263987 A | 10/2007 |
| JP | 2007321108 A | 12/2007 |
| JP | 2011509434 | 3/2011 |
| KR | 20030069461 A | 8/2003 |
| KR | 20040029251 A | 4/2004 |
| KR | 20040045790 A | 6/2004 |
| KR | 20050065154 A | 6/2005 |
| KR | 20050083709 A | 8/2005 |
| KR | 2005-23083 A | 9/2006 |
| KR | 20070003388 A | 1/2007 |
| KR | 20070113749 A | 11/2007 |
| TW | I304519 A | 9/2003 |
| TW | 200717045 | 5/2007 |
| TW | 200732690 A | 9/2007 |
| WO | 03070849 A1 | 8/2003 |
| WO | 2008/001855 A1 | 1/2008 |

OTHER PUBLICATIONS

International Search Report PCT/KR2009/000106, dated Aug. 20, 2009.
International Search Report PCT/KR2009/000105, dated Aug. 26, 2009.
Office Action from KR Application No. 10-2009-0001500, dated Feb. 8, 2011.
Office Action from KR Application No. 10-2009-0001501, dated Feb. 8, 2011.
Young Soo Soh: "Miscibility of Polymethyl Methacrylate With Poly (Hidroxy Ether) of Bisphenol A" Journal of Applied Polymer Science, John Wiley and Sons Inc. New York, US, vol. 45, No. 10, Aug. 5, 1992, pp. 1831-1835 XP 000281210.
Chinese Office Action for 200980101851.2 dated Feb. 29, 2012.
JPO Website Machine English Translation of JP 07-304870, Matsumoto et al., Nov. 21, 1995.
Supplementary European Search Report for EP09739004 dated Mar. 22, 2012.
Extended European Search Report (EESR) issued on Jul. 5, 2011 in the corresponding European patent application No. 09700270.
Office Action from Taiwan for Application No. 098100472 dated Jul. 11, 2012.
Office Action from Taiwan counterpart application No. 098114364 dated Aug. 24, 2012.
Extended European Search Report for Application No. EP09739003 dated Oct. 18, 2012.

* cited by examiner

RESIN COMPOSITION AND OPTICAL FILMS FORMED BY USING THE SAME

CROSS REFERENCE TO RELATED APPLICATIONS

The present application is a Continuation of International Application No. PCT/KR2009/002302, filed Apr. 30, 2009, which claims the benefit of Korean Patent Application No. 10-2008-0040843, filed Apr. 30, 2008 and 10-2009-0002069, filed Jan. 9, 2009. The disclosures of said applications are incorporated by reference herein.

TECHNICAL FIELD

The present invention relates to a resin composition that is capable of forming a film which has excellent heat resistance and optical transparency, low haze, and excellent optical property, is not easily broken, and has excellent mechanical strength and durability, and an optical film that is formed by using the same.

BACKGROUND OF THE INVENTION

Recently, display technologies using various methods such as a plasma display panel (PDP), a liquid crystal display (LCD) and the like that are used instead of a known braun tube in accordance with the development of optical technologies are suggested and sold. The higher properties of the polymer material for displays are required. For example, in the case of the liquid crystal display, according to the development toward the thin film, the lightness, and enlargement of the picture area, the wide viewing angle, the high contrast, the suppression of change in picture color tone according to the viewing angle and the uniformity of the picture display are particularly considered as important problems.

Therefore, various polymer films such as a polarizing film, a polarizer protection film, a retardation film, a plastic substrate, a light guide plate and the like are used, and as the liquid crystal, various modes of liquid crystal displays such as twisted nematic (TN), super twisted nematic (STN), vertical alignment (VA), in-plane switching (IPS) liquid crystal cells are developed. Since these liquid crystal cells have all intrinsic liquid crystal alignment, the intrinsic optical anisotropic property is ensured, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. Thus, a retardation compensation according to the kind of liquid crystal molecule is required. For example, since most liquid crystal molecules that are used in a vertical alignment method have the thickness refractive index that is larger than the average in-plane refractive index in a liquid crystal display surface, in order to compensate this, a compensation film in which the thickness refractive index has retardation property which is smaller than the average in-plane refractive index is required.

In addition, light does not pass through the front sides of two polarizing plates that are vertical to each other, but if the angle is inclined, the light axes of two polarizing plates are not vertical to each other, thus light leakage occurs. In order to compensate this, the compensate film having the in-plane retardation is required. In addition, the display device using the liquid crystal requires both the thickness retardation compensation and the in-plane retardation compensation in order to widen the angle view.

Requirement of the retardation compensation film is to easily control the birefringence. However, the film birefringence is formed by a basic birefringence which belongs to the material and the orientation of polymer chains in the film. The orientation of the polymer chains is mostly forcibly performed by force applied from the outside or is caused by the intrinsic properties of the material, and the orientation method of the molecules by the external force is to uniaxially or biaxially stretch the polymer film.

In the related art, there is a need to develop a polymer material that satisfies the above requirement properties in order to be used in displays.

SUMMARY OF THE INVENTION

The present invention relates to a resin composition that is capable of manufacturing a film having excellent optical property and optical transparency and low haze, is capable of providing a film that is not easily broken unlike an acryl-based film that is easily broken while stretching processes are carried out, and has excellent mechanical strength and processability, and durability such as heat resistance, and is capable of controlling in-plane retardation and thickness retardation of the film, and an optical film that is formed by using the same.

The present invention provides a resin composition which comprises (a) a (meth)acrylate-based unit comprising one or more (meth)acrylate-based derivatives; (b) an aromatic based unit having chain having the hydroxy group containing portion and aromatic moiety; and (c) a styrene-based unit comprising one or more styrene-based derivatives.

In addition, the present invention provides an optical film that is formed by using the resin composition.

A resin composition according to the present invention has excellent optical property and optical transparency, and low haze, is not easily broken unlike an acryl-based film that is easily broken while stretching and alignining processes are carried out, and has excellent mechanical strength and processability, and heat resistance, and has controlled photoelasticity coefficient. Thus, it may provide a film having a small change in retardation caused by external stress, and the in-plane retardation and the thickness retardation in the film may be easily controlled. Accordingly, the optical film that is formed by using the resin composition may be used for various purposes such as IT (information technology) devices like display devices.

DETAILED DESCRIPTION

A resin composition according to the present invention comprises (a) a (meth)acrylate-based unit comprising one or more (meth)acrylate-based derivatives; (b) an aromatic based unit having chain having the hydroxy group containing portion and aromatic moiety; and (c) a styrene-based unit comprising one or more styrene-based derivatives. The above (a) to (c) the units may be included in different compounds, and two or more units of the (a) to (c) the units may be included in one compound.

In the present invention, the (meth)acrylate-based unit provides a weak negative in-plane retardation (Rin) and a weak thickness retardation (Rth), the aromatic-based unit comprising the chain and aromatic moiety having the hydroxy group containing portion provides a positive in-plane retardation (Rin) property and a positive thickness retardation (Rth)

property, and the styrene-based unit provides a strong negative in-plane retardation (Rin) and a negative thickness retardation (Rth). Here, the negative in-plane retardation means the highest in-plane refractive index that is perpendicular in respects to the stretching direction, the positive in-plane retardation means the highest refractive index in respects to the stretching direction, the negative thickness retardation means that the thickness retardation is larger than the in-plane average refractive index, and the positive thickness retardation means that the in-plane average refractive index is larger than the thickness retardation.

Because of the retardation characteristics of the above units, the retardation characteristics of the optical film may depend on the composition, the stretching direction, the stretching ratio, and the stretching method such as uniaxial or biaxial stretching of each component. Therefore, in the present invention, since the films having various retardation characteristics may be manufactured by controlling the compositions and the stretching method of the components, the film having excellent optical property may be manufactured, and the optical film that hardly has the remaining retardation may be provided.

In addition, the resin composition according to the present invention is capable of providing an optical film having excellent mechanical properties unlike an acryl based film that is easily broken. In addition, (a) the unit is capable of providing excellent optical properties, and (b) the unit is capable of providing excellent miscibility with the compound comprising (a) the unit. In addition, since the resin composition according to the present invention is capable of controlling a value of photoelasticity coefficient according to the content of (b) the unit, the film having a small change in retardation value by external stress may be manufactured.

The resin composition according to the present invention may further include a cyclic-based unit having (d) a cyclic moiety. (d) the unit may be included in (a) the unit, in a compound comprising at least one of (b) the unit and (c) the unit, and in a compound that is different from the compound in which at least one of (a) the unit, (b) the unit and (c) the unit is included. (d) the unit is capable of providing excellent heat resistance to the film.

According to an embodiment of the present invention, the copolymer comprising (a) the unit and (d) the unit, the copolymer comprising (a) the unit and (c) the unit, the copolymer comprising (c) the unit and (d) the unit, and the copolymer comprising (a) the unit, (b) the unit and (c) the unit may be used. At this time, the above copolymers may include at least one of two types or more units.

As a detailed example, the copolymer comprising (a) the unit such as methyl(meth)acrylate and (d) the unit such as N-cyclohexylmaleimide, that is, poly(N-cyclohexylmaleimide-co-methyl(meth)acrylate), may be used. In addition, the copolymer comprising (c) the unit such as styrene and (d) the unit such as maleic anhydride may be used. In addition, the copolymer comprising methyl methacrylate as (a) the unit, styrene and alpha methyl styrene as (c) the unit, and N-cyclohexylmaleimide as (d) the unit may be used. In addition, the copolymer comprising methyl methacrylate as (a) the unit, styrene or alpha methyl styrene as (c) the unit, and N-cyclohexylmaleimide and maleic anhydride as (d) the unit may be used. However, the above examples are set forth to illustrate the present invention, but are not to be construed to limit the present invention.

The content of each unit is not particularly limited, and in consideration of the role of each component, in order to obtain desired in-plane retardation, thickness retardation, optical property, mechanical property, transparency, miscibility and the like, the content of each unit may be determined. For example, the contents of (a) the unit, (b) the unit, (c) the unit and (d) the unit may be selected within the range of about 0.1 to 99 wt %. In detail, it is preferable that the content of (a) the unit is in the range of about 50 to 98 wt %, it is preferable that the content of (b) the unit is in the range of about 0.5 to about 40 wt %, and it is preferable that the content of (c) the unit is in the range of about 0.5 to about 30 wt %. It is preferable that the content of (d) the unit is in the range of about 0.5 to about 45 wt %.

In the present invention, the compound comprising (a) the unit, (b) the unit, (c) the unit or (d) the unit may be a homopolymer or a copolymer, and the compound may further include units other than (a) the unit, (b) the unit, (c) the unit and (d) the unit within the scope of the present invention. The copolymer may be a random or block copolymer.

In the present invention, it should be understood that (a) the unit may include (meth)acrylate and a (meth)acrylate derivative. To be specific, as the (meth)acrylate based monomer, there are methyl methacrylate, methyl acrylate, ethyl acrylate, butyl acrylate, 2-ethylhexyl methacrylate, lauryl methacrylate, benzyl methacrylate and the like, but it is not limited thereto. In particular, it is most preferable that methyl methacrylate (MMA) is used.

In the present invention, as the compounds comprising (a) the unit, a copolymer comprising the (meth)acrylate based unit and (d) the cyclic based unit having the cyclic moiety may be used. The content of the (meth)acrylate based unit in the copolymer comprising the (meth)acrylate based unit and the cyclic based unit having the cyclic moiety is in the range of about 50 to 99% by weight, and preferably in the range of about 70 to about 98% by weight, and the content of the cyclic based unit having the cyclic moiety is in the range of about 1 to 50% by weight and preferably about 2 to about 30% by weight. When the content of the cyclic based unit having the cyclic moiety is 50% by weight or less, it is useful to reduce a haze value of the film.

The cyclic based unit having the cyclic moiety of the copolymer comprising the (meth)acrylate based unit and the cyclic based unit having the cyclic moiety functions to improve heat resistance of the film. Examples of the cyclic based unit having the cyclic moiety will be described below. However, it is most preferable that the cyclic based (a) unit having the cyclic moiety, which is included in the copolymer in conjunction with the (meth)acrylate based unit, is a maleimide based unit including a maleimide portion. The maleimide based unit may include a cyclic moiety that is derived from N-cyclohexylmaleimide, N-phenylmaleimide, N-methylmaleimide, N-butylmaleimide and the like, but is not limited thereto. In particular, it is most preferable that it includes the cyclic moiety that is derived from N-cyclohexylmaleimide.

The copolymer comprising the (meth)acrylate based unit and the cyclic based unit having the cyclic moiety may be manufactured by a method such as a bulk polymerization, a solution polymerization, a suspension polymerization, an emulsion polymerization and the like using a (meth)acryl based monomer and a cyclic based monomer such as a maleimide based monomer.

In the present invention, it is preferable that the number average molecular weight of the (b) aromatic based unit comprising the chain having the hydroxy group containing portion and aromatic moiety is in the range of 1,500 to 2,000,000 g/mol. It is preferable that the aromatic based resin includes the phenoxy based resin. Here, the phenoxy based resin includes a structure in which at least one oxygen radical is bonded to the benzene cycle. For example, the (b) aromatic based unit having the chain having the hydroxy group containing portion and aromatic moiety may include one or more units that are represented by the following Formula 1. The (b) aromatic based unit includes 5 to 10,000 of the unit of the following Formula 1, preferably 5 to 7,000 of the unit of the following Formula 1, and more preferably 5 to 5,000 of the unit of the following Formula 1. In the case when two kinds or more units of the following Formula 1 are included in the (b) aromatic based unit, they may be included in a random form, an alternating form, or a block form.

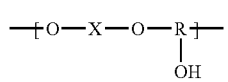

[Formula 1]

wherein X is a divalent group comprising at least one benzene cycle and R is a straight- or branched-chained alkylene group having 1 to 6 carbon atoms.

To be specific, it is preferable that X is a divalent group that is derived from the compounds of the following Formulas 2 to 4, but is not limited thereto.

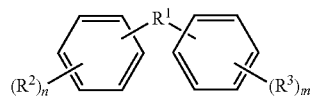

[Formula 2]

$R^1$ is a direct bond, straight- or branched-chained alkylene having 1 to 6 carbon atoms, or cycloalkylidene having 3 to 20 carbon atoms, $R^2$ and $R^3$ are each hydrogen, straight- or branched-chained alkyl having 1 to 6 carbon atoms, or straight- or branched-chained alkenyl having 2 to 6 carbon atoms, and n and m are each an integer in the range of 1 to 5.

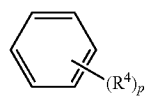

[Formula 3]

$R^4$ is each hydrogen, straight- or branched-chained alkyl having 1 to 6 carbon atoms, or straight- or branched-chained alkenyl having 2 to 6 carbon atoms, and p is an integer in the range of 1 to 6.

[Formula 4]

$R^6$ and $R^7$ are each a direct bond, straight- or branched-chained alkylene having 1 to 6 carbon atoms, or cycloalkylidene having 3 to 20 carbon atoms, $R^5$ and $R^8$ are each hydrogen, straight- or branched-chained alkyl having 1 to 6 carbon atoms, or straight- or branched-chained alkenyl having 2 to 6 carbon atoms, and q and r are each an integer in the range of 1 to 5.

Detailed examples of the compounds that are represented by Formulas 2 to 4 are the same as the following compounds, but are not limited thereto.

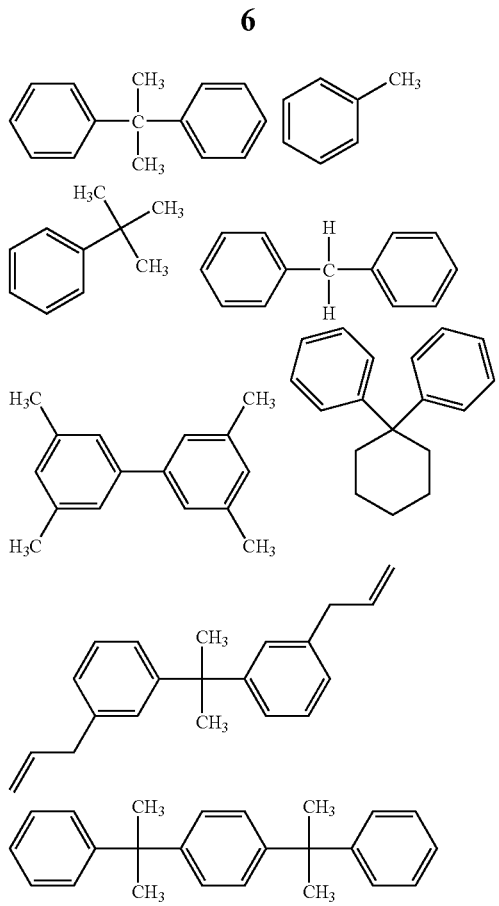

It is most preferable that the (b) aromatic based unit includes one kind or more 5 to 10,000 phenoxy based units that are represented by the following Formula 5.

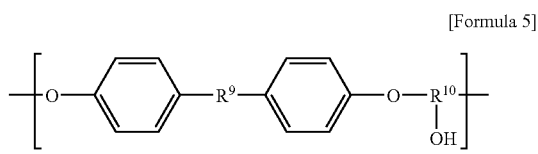

[Formula 5]

wherein $R^9$ is a direct bond, straight- or branched-chained alkylene having 1 to 6 carbon atoms, and $R^{10}$ is a direct bond, straight- or branched-chained alkylene having 1 to 6 carbon atoms.

It is preferable that Formula 5 is represented by the following Formula 6.

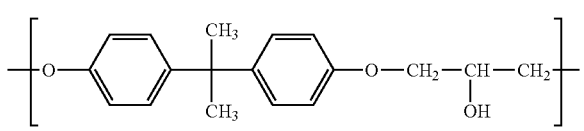

[Formula 6]

An end of the aromatic based resin may be an OH group.

In the present invention, (c) the styrene-based unit is construed to include the styrene-based derivative as well as styrene. The styrene-based derivative includes a compound comprising one or more substituent groups having aliphatic hydrocarbons or hetero atoms at a benzene cycle or vinyl group of styrene, and in detail, it includes alpha methyl styrene.

In the present invention, as the compound comprising (c) the unit, the copolymer comprising the styrene-based unit and (d) the cyclic moiety may be used. The content of the styrene-based unit in the copolymer comprising the styrene-based unit and the cyclic-based unit having the cyclic moiety is in the range of about 1 to about 99 wt %, preferably in the range of about 30 to about 99 wt %, and more preferably in the range of about 40 to about 95 wt %, and the content of the cyclic-based unit having the cyclic moiety is in the range of about 1 to about 99 wt %, preferably in the range of about 1 to about 70 wt %, and more preferably in the range of about 5 to about 60 wt %. By melting and mixing the copolymer comprising the styrene-based unit and the cyclic-based unit having the cyclic moiety and using it, the adhesion property and heat resistance of the film may be improved. If the content of the cyclic-based unit having the cyclic moiety is very low, the miscibility may be slightly reduced. Examples of the cyclic-based unit having the cyclic moiety will be described later. However, it is most preferable that the cyclic-based unit having the cyclic moiety that is included in the copolymer in conjunction with (c) the unit is a maleic anhydride-based unit including a maleic anhydride portion.

In the present invention, (d) the unit may improve the heat resistance of the film. The content of (d) unit is in the range of about 0.1 to about 99 wt %, and preferably about 0.5 to about 40 wt %. Examples of the cyclic moiety of (d) the unit include maleic anhydride, maleimide, glutaric anhydride, glutalimide, lactone and lactame, but are not limited thereto.

According to an embodiment of the present invention, as the components that include (a) the unit to (d) the unit, 1) a copolymer comprising the (meth)acrylate based unit and the maleimide based unit, 2) the resin comprising the phenoxy based (phenoxy-based) unit, and 3) the copolymer comprising the styrene-based unit and the maleic anhydride unit may be used. In this case, it is preferable that the content of each component is in the range of 1 to 99 wt %. To be specific, the content of 1) the copolymer is preferably in the range of about 50 to about 99 wt % and more preferably in the range of about 75 to about 98 wt %. The content of the 2) resin is preferably in the range of about 0.5 to about 40 wt % and more preferably in the range of about 1 to about 30 wt %. The content of 3) the copolymer is preferably in the range of about 0.5 to about 30 wt % and more preferably in the range of about 1 to about 20 wt %.

In particular, in the case when the content of the maleimide based monomer in the copolymer comprising 1) the (meth) acrylate based unit and maleimide based unit is 50% by weight or less, regardless of the mixing ratio of 1) to 3) components, it can show miscibility in respects to the entire range, and the optical film which is prepared to using the resin composition is advantageous in that it has a single glass transition temperature $T_g$.

The resin composition according to the present invention may be used without a limit as long as it is used for the purpose of requiring optical properties, heat resistance, adhesion property and the like, and it may be used as a material of the optical film.

The thickness of the optical film that is manufactured by using the resin composition according to the present invention is in the range of 5 to 500 μm, and more preferably 5 to 300 μm, but is not limited thereto. The transmittance of the optical film is 90% or more, the haze is 2.5% or less, preferably 1% or less, and more preferably 0.5% or less. It is preferable that the glass transition temperature of the optical film according to the present invention is 100° C. or more.

The optical film may control the value of the photoelasticity coefficient at a very small value according to the content of (b) the unit and (c) the unit, and in this case, a characteristic in which a change in retardation caused by the external stress hardly occurs is ensured, such that a light leakage phenomenon may be reduced.

The resin composition according to the present invention may be manufactured by melting and blending the above components. The melting and the mixing of the components may be carried out by using an extruder.

The resin composition may further include a lubricant, an antioxidant, a UV stabilizer and absorber, a thermal stabilizer and the like that are generally used.

The optical film according to the present invention may be formed by using the above resin composition. In detail, the optical film according to the present invention may be manufactured by using the method that comprises the steps of preparing the resin composition; and casting the film by using the resin composition. The method may further comprise the step of uniaxially or biaxially stretching the film.

When the optical film according to the present invention is manufactured, a method that is known in the art may be used, and in detail, an extrusion molding method may be used. For example, after the resin composition is dried under a vacuum and removes water and dissolved oxygen, the composition is supplied from the raw material hopper to a single or twin extruder that is filled with nitrogen, and melted at a high temperature to obtain a raw material pellet, the obtained raw material pellet is dried under a vacuum, melted from the raw material hopper to a single extruder that is substituted with nitrogen, passes through a coat hanger type T-die, and a chrome-coated casting roll and a drying roll to manufacture the film.

The method for manufacturing the optical film according to the present invention may further include the step of uniaxially or biaxially stretching the film.

Hereinbelow, the present invention will be described in detail with reference to Examples. The present invention may, however, be embodied in many different forms and should not be construed as being limited to the Examples set forth herein. Rather, these Examples are provided to fully convey the concept of the invention to those skilled in the art.

Example

As the poly(N-cyclohexylmaleimide-co-methylmethacrylate) resin, IH830HR resin that was manufactured by LGMMA, Co., Ltd. was used, as the phenoxy-based resin, InChemRez Phenoxy PKFE® resin that was the phenoxy resin manufactured by InChem Corporation was used, and as the styrene-maleic anhydride copolymer resin, DYLARK® 332 (styrene 85 wt %, maleic anhydride 15 wt %) that was manufactured by NOVA Chemicals, Co., Ltd. was used.

On the basis of 100 parts by weight of poly(N-cyclohexylmaleimide-co-methylmethacrylate), the resin composition in which 5.9 to 23.5 parts by weight of the styrene-maleic anhydride copolymer resin and 5 to 40 parts by weight of the phenoxy-based resin were uniformly mixed with each other was provided to a 24ϕ extruder in which nitrogen was substituted from the raw material hopper to the extruder, and melted at 250° C. to manufacture the raw material pellet.

The pellet was dried in vacuum, and the glass transition temperature thereof was measured by using a differential scanning calorimeter (Mettler Toledo Co., Ltd., DSC823) under the nitrogen atmosphere at a heating rate of 10° C.

The obtained raw material pellets were dried, melted at 260° C. by using the extruder, and passed through the coat hanger type of T-die, the chrome-coated casting roll and the dry roll to manufacture the film that had the thickness of 150 μm. The stretching was carried out by using the simple stretching machine for test while the stretching temperature and the stretching ratio were changed.

The transmission of the manufactured film was measured by using the spectrophotometer (n&k spectrometer, manufactured by n&k Technology, Co., Ltd.). The haze was measured by using the hazemeter (Murakami Research Lab). The in-plane retardation ($R_{in}$) and the thickness retardation ($R_{th}$) of the film before and after the stretching were measured by using the birefringence measuring apparatus (Axoscan). Each retardation value is defined by the following equations.

$$R_{in} = (n_x - n_y) \times d$$

$$R_{th} = [(n_x + n_y)/2 - n_z] \times d$$

In Equations 1 and 2, $n_x$ is the largest refractive index among in-plane refractive indexes of the film, $n_y$ is the refractive index in a direction that is vertical to $n_x$ of the in-plane refractive index of the film, $n_z$ is the thickness refractive index of the film, and d is the thickness of the film.

The Example results of the resin composition according to the content ratio of the copolymer of the phenoxy resin and the styrene-maleic anhydride are described in the following Table 1.

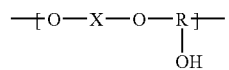

wherein X is a divalent group comprising at least one benzene cycle and R is a straight- or branched-chained alkylene group having 1 to 6 carbon atoms, and wherein the copolymer further comprises a cyclic based unit comprising cyclic moiety.

2. The resin composition of claim 1, wherein the cyclic moiety is selected from the group consisting of a maleic anhydride, maleimide, glutaric anhydride, glutalimide, lactone and lactame.

3. The resin composition of claim 1, wherein the (meth)acrylate-based unit is a copolymer of the (meth)acrylate derivative and a cyclic-based unit comprising a cyclic moiety.

4. The resin composition of claim 3, wherein the cyclic moiety of the cyclic-based unit is selected from the group consisting of a maleic anhydride, maleimide, glutaric anhydride, glutalimide, lactone and lactame.

5. The resin composition of claim 3, wherein the content of the (meth)acrylate derivative in the copolymer is in the range of about 50% to about 99% in respects to the weight of the copolymer.

6. The resin composition of claim 1, wherein the styrene-based unit is a copolymer of the styrene derivative and a cyclic-based unit having a cyclic moiety.

TABLE 1

| Example | parts by weight | | | Tg (° C.) | transmission (%) | haze (%) | stretching temperature (° C.) | stretching ratio (%) | retardation (nm) | |
|---|---|---|---|---|---|---|---|---|---|---|
| | HR | Dylark | PKFE | | | | | | Rin | Rth |
| Example1 | 100.0 | 5.9 | 5.0 | 123 | 91.0 | 0.3 | 123 | 100 | 22.9 | −13.2 |
| Example2 | 100.0 | 5.9 | 10.0 | 121 | 90.7 | 0.3 | 120 | 100 | 2.5 | 2.7 |
| Example3 | 100.0 | 5.9 | 22.0 | 115 | 90.4 | 0.3 | 116 | 100 | 56.1 | 37.2 |
| Example4 | 100.0 | 11.8 | 10.0 | 121 | 90.6 | 0.3 | 105 | 100 | 32.7 | −17.0 |
| Example5 | 100.0 | 17.6 | 40.0 | 107 | 90.5 | 0.3 | 133 | 100 | 6.3 | 7.9 |
| Example6 | 100.0 | 23.5 | 10.0 | 122 | 90.3 | 0.4 | 133 | 100 | 37 | −26.5 |
| Example7 | 100.0 | 23.5 | 15.0 | 123 | 90.2 | 0.4 | 133 | 100 | 55.2 | −42.2 |
| Example8 | 100.0 | 23.5 | 20.0 | 123 | 90.2 | 0.4 | 133 | 100 | 42.7 | −23.2 |
| Comparative Example1 | 100.0 | 0.0 | 0.0 | 125 | 91.5 | 0.2 | 130 | 100 | 5.4 | −5.4 |
| Comparative Example2 | 100.0 | 4.8 | 0.0 | 125 | 91.5 | 0.2 | 125 | 100 | 43.3 | −22.2 |
| Comparative Example3 | 100.0 | 0.0 | 9.0 | 120 | 91.5 | 0.2 | 125 | 100 | 18.6 | 23.1 |

As seen from the above Example, the resin composition according to the present invention may provide the film having excellent optical properties and heat resistance, and provide various optical films by controlling the retardation through the stretching.

The invention claimed is:

1. A resin composition comprising:

(A) at least one copolymer comprising more than one unit selected from the group consisting of (1) a (meth)acrylate-based unit comprising one or more (meth)acrylate-based derivatives, and (2) a styrene-based unit comprising one or more styrene-based derivatives; and (B) an aromatic based resin having a chain having the hydroxy group containing portion and aromatic moiety, wherein the aromatic based resin includes 5 to 10,000 at least one type of units represented by Formula 1:

7. The resin composition of claim 6, wherein the cyclic moiety of the cyclic-based unit is selected from the group consisting of maleic anhydride, maleimide, glutaric anhydride, glutalimide, lactone and lactame.

8. The resin composition of claim 6, wherein the copolymer includes about 30% to about 99% of the styrene-based derivative and about 1% to about 70% of the cyclic-based unit on the basis of the weight of the copolymer.

9. The resin composition of claim 1, wherein the (meth)acrylate-based unit forms a copolymer in conjunction with the styrene-based unit.

10. The resin composition of claim 1, wherein the aromatic based resin includes a phenoxy based resin.

11. The resin composition of claim 1, wherein the aromatic based resin has a number average molecular weight in the range of 1,500 to 2,000,000 g/mol.

12. The resin composition of claim 1, wherein X is a divalent group that is selected from the group consisting of the following Structural Formulas:

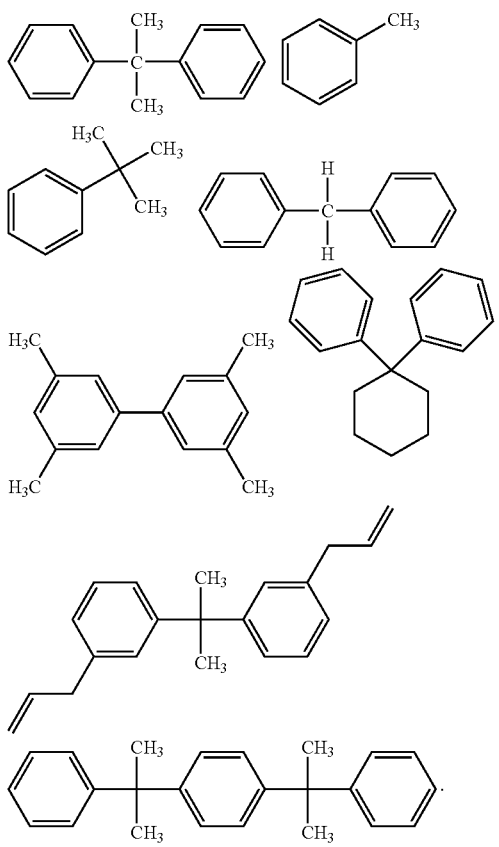

13. The resin composition of claim 1, wherein the aromatic based resin includes 5 to 10,000 units that are represented by Formula 6:

[Formula 6]

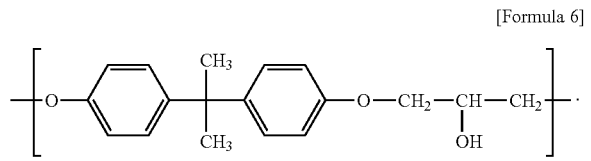

14. The resin composition of claim 1, wherein the styrene-based unit includes styrene having or not having one or more substituent groups that are selected from the groups including aliphatic hydrocarbons and hetero atoms at a benzene cycle or vinyl group of styrene.

15. The resin composition of claim 1, wherein the resin includes about 1% to about 99% of the styrene-based unit on the basis of the weight of the resin.

16. The resin composition of claim 1, wherein the (meth)acrylate-based unit is a copolymer of the (meth)acrylate derivative and maleimide, the aromatic-based unit includes 5 to 10,000 units that are represented by Formula 6, and the styrene-based unit is the copolymer of the styrene derivative and maleic anhydride:

[Formula 6]

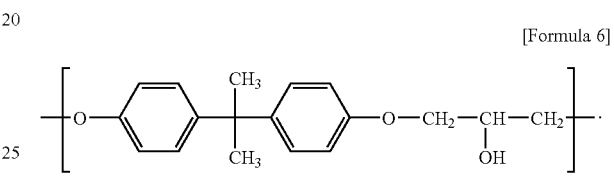

17. The resin composition of claim 16, wherein the content of the copolymer of the (meth)acrylate derivative and maleimide is in the range of about 50% to about 99% on the basis of the weight of resin, the content of the aromatic-based unit is in the range of about 0.5% to about 40% on the basis of the weight of resin, and the content of the copolymer of the styrene derivative and maleic anhydride is in the range of about 0.5% to about 30% on the basis of the weight of resin.

18. The resin composition of claim 1, wherein the resin composition includes the copolymer of the (meth)acrylate-based unit, the styrene-based unit and the cyclic-based unit.

19. The resin composition of claim 1, wherein the resin composition has a single glass transition temperature.

20. An optical film that is formed by using the resin composition of claim 1.

* * * * *